United States Patent
P K et al.

(10) Patent No.: US 12,288,139 B2
(45) Date of Patent: Apr. 29, 2025

(54) ITERATIVE MACHINE LEARNING AND RELEARNING

(71) Applicant: SAP SE, Walldorf (DE)

(72) Inventors: Sumaiya P K, Bangalore (IN); Prateek Bajaj, Bangalore (IN)

(73) Assignee: SAP SE, Walldorf (DE)

( * ) Notice: Subject to any disclaimer, the term of this patent is extended or adjusted under 35 U.S.C. 154(b) by 1081 days.

(21) Appl. No.: 17/109,835

(22) Filed: Dec. 2, 2020

(65) Prior Publication Data

US 2022/0172108 A1     Jun. 2, 2022

(51) Int. Cl.
    *G06N 20/00*     (2019.01)
    *G06F 16/27*     (2019.01)
    *G06N 5/04*     (2023.01)

(52) U.S. Cl.
    CPC ............ *G06N 20/00* (2019.01); *G06F 16/27* (2019.01); *G06N 5/04* (2013.01)

(58) Field of Classification Search
    CPC .......... G06N 20/00; G06N 5/04; G06F 16/27
    See application file for complete search history.

(56) References Cited

U.S. PATENT DOCUMENTS

| | | | | |
|---|---|---|---|---|
| 8,843,427 | B1 * | 9/2014 | Lin ......................... | G06N 20/00 705/16 |
| 10,339,468 | B1 * | 7/2019 | Johnston ................. | G06N 20/20 |
| 11,868,440 | B1 * | 1/2024 | Patel ........................ | G06T 1/20 |
| 2011/0246406 | A1 * | 10/2011 | Lahav ..................... | G06N 5/046 706/46 |
| 2021/0103857 | A1 * | 4/2021 | Wang ........................ | G01J 3/28 |
| 2021/0224684 | A1 * | 7/2021 | Sarkar ..................... | G06F 16/907 |
| 2022/0067570 | A1 * | 3/2022 | Kong ..................... | G06V 10/776 |
| 2022/0083914 | A1 * | 3/2022 | Okamoto ............... | G06N 20/00 |
| 2023/0096957 | A1 * | 3/2023 | Noro ....................... | G06N 20/00 706/12 |
| 2023/0385706 | A1 * | 11/2023 | Toro Isaza ............. | G06N 20/00 |

OTHER PUBLICATIONS

Crosby et al., "BlockChain Technology: Beyond Bitcoin," *Applied Innovation Review*, Issue No. 2, pp. 6-19, Jun. 2016.

(Continued)

*Primary Examiner* — Andrew T Chiusano
(74) *Attorney, Agent, or Firm* — Klarquist Sparkman, LLP

(57) ABSTRACT

Technologies are provided for iterative machine learning and relearning. A training dataset can be divided into a plurality of training data blocks which can be used to generate separate machine learning models. The accuracy of the machine learning models can be assessed using a test dataset. Training data blocks which result in models with good accuracy can be combined into larger training data blocks which can then be used to generate new machine learning models. The process of combining training data blocks can be repeated as long as the resulting machine learning model has acceptable accuracy. However, if a model for a combined training data block has a poorer accuracy than the machine learning models for its component training data blocks, then the combined training data block and its machine learning model can be forgotten and its component training data blocks (and their associated machine learning models) can be relearned.

19 Claims, 8 Drawing Sheets

(56) References Cited

OTHER PUBLICATIONS

Cawley et al., "On Over-fitting in Model Selection and Subsequent Selection Bias in Performance Evaluation," *Journal of Machine Learning Research*, vol. 11, pp. 2079-2107, Jul. 2010.
Jabbar et al., "Methods to Avoid Over-Fitting and Under-Fitting in Supervised Machine Learning (Comparative Study)," *Computer Science , Communication & Instrumentation Devices*, pp. 163-172, Dec. 2014.

\* cited by examiner

ITERATIVE MACHINE LEARNING AND RELEARNING

BACKGROUND

In at least some machine learning scenarios, the quantity and quality of training data can have a significant impact on the accuracy of generated models. For example, poor quality and/or low quantities of training data can lead to models that are under trained or over trained. Also, the addition of new training data of poor quality to a previously trained model can cause the accuracy of the model to degrade. In such scenarios, there may be little or no indication that the additional data is of poor quality until it has been applied to, and has negatively impacted, the model.

Therefore, there is room for improvement in technologies for dealing with underfitting and overfitting in machine learning applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an example embodiment, a method comprises partitioning a machine learning model training dataset into a plurality of training data blocks; generating a first machine learning model using a first training data block, of the plurality of training data blocks; generating a second machine learning model using a second training data block, of the plurality of training data blocks; generating accuracy scores for the first machine learning model and the second machine learning model; selecting the first training data block and the second training data block for combination based, at least in part, on the accuracy scores for the first machine learning model and the second machine learning model; generating a third training data block that comprises a combination of the first training data block and the second training data block; generating a third machine learning model using the third training data block; deactivating the first training data block, the second training data block, the first machine learning model, and the second machine learning model, wherein the deactivating comprises making the first and second training data blocks and the first and second machine learning models unavailable for future use; and activating the third training data block and the third machine learning model, wherein the activating comprises making the third training data block and the third machine learning model available for future use.

In another example embodiment, a system comprises a computer-readable storage storing a training dataset and a test dataset. The system further comprises a computing device connected to the computer-readable storage, wherein the computing device is configured to partition at least part of the training dataset into a plurality of training data blocks. The computing device is further configured to, for each of the plurality of training data blocks: generate a machine learning model using the training data block, and determine accuracy scores for the machine learning model using the test dataset. The computing device is further configured to select two training data blocks, of the plurality of training data blocks, based on the accuracy scores of the plurality of training data blocks; deactivate the two training data blocks and the machine learning models for the two training data blocks; generate a new training data block based on the two training data blocks; generate a new machine learning model using the new training data block; and activate the new training data block and the new machine learning model.

In another example embodiment, one or more computer-readable storage media store instructions that, when executed by one or more processors, cause the one or more processors to perform operations, the operations comprising: partitioning a machine learning model training dataset into a plurality of training data blocks; generating a first machine learning model using a first training data block, of the plurality of training data blocks; generating a second machine learning model using a second training data block, of the plurality of training data blocks; generating accuracy scores for the first machine learning model and the second machine learning model; based, at least in part, on the accuracy scores for the first machine learning model and the second machine learning model, generating a third training data block that comprises a combination of the first training data block and the second training data block; generating a third machine learning model using the third training data block; deactivating the first training data block, the second training data block, the first machine learning model, and the second machine learning model; and activating the third training data block and the third machine learning model.

As described herein, a variety of other features and advantages can be incorporated into the technologies as desired.

DETAILED DESCRIPTION

Example 1—Overview

Figure 1A:
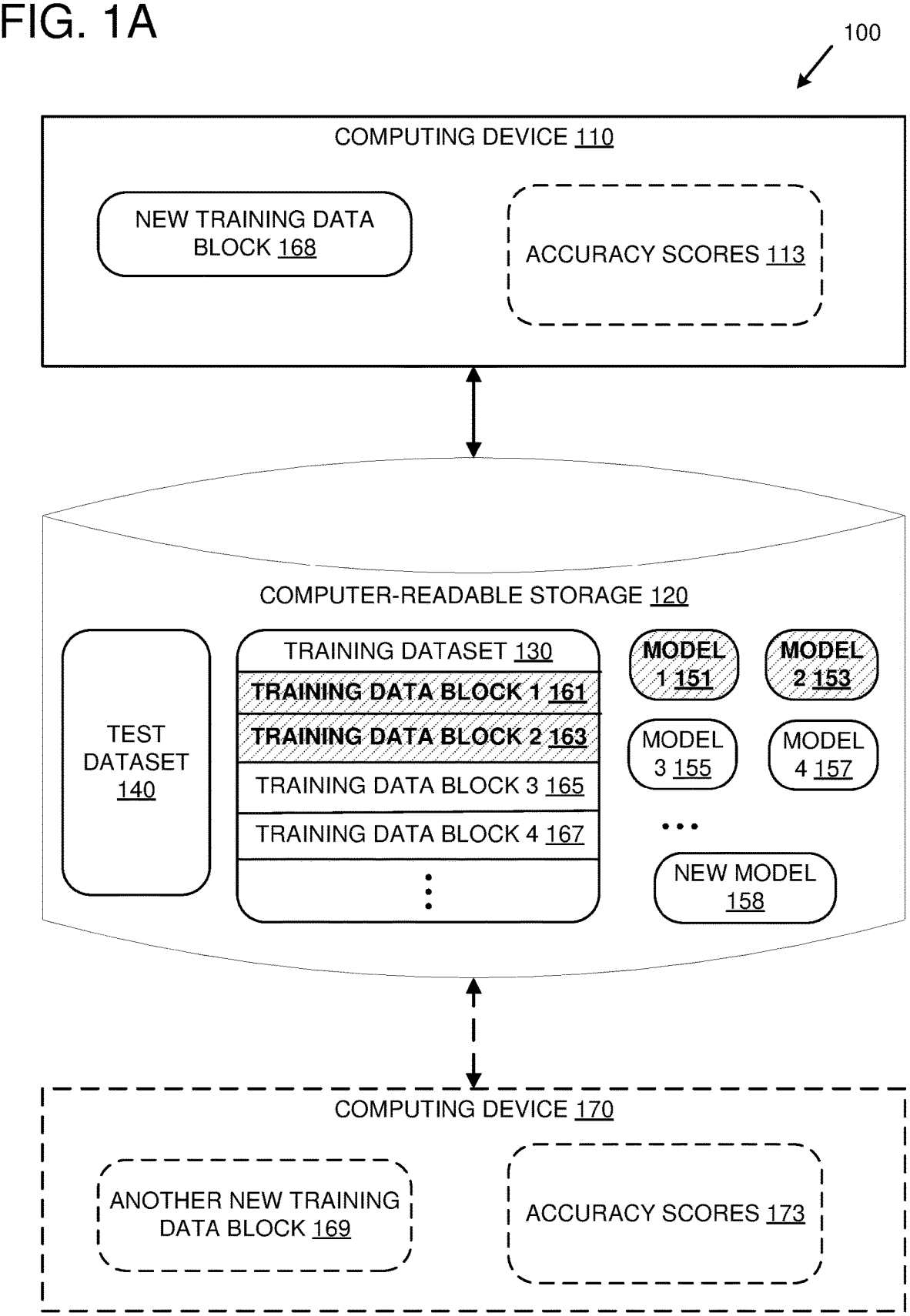
FIGS. 1A-B are system diagrams depicting an example system configured for iterative machine learning and relearning.

The description provided herein is directed to various technologies for iterative machine learning and relearning.

A machine learning process can be used to train a machine learning model based on a training dataset. However, the quality of the data in the training dataset can have a significant impact on the ultimate quality of the generated model. Poor quality training records can result in a machine learning model that is under training or over trained, or that has unacceptable accuracy. Additionally, if after a model has been trained initially, additional training data is provided for additional training, the additional training data may negatively impact the accuracy of the model if it is of poor quality. However, it can be difficult to detect poor quality data before it is applied to, and negatively impacts the accuracy of, the machine learning model.

Furthermore, in many modern machine learning scenarios, training datasets are very large, often comprising millions, or even billions, of training records. When faced with such large volumes of training data, it is almost certain that some portion of the training records will be faulty. However, it can be difficult, if not impossible, to tell beforehand which records are faulty. Also, once a training dataset has been used to train a machine learning model with low accuracy, it can be difficult, if not impossible, to determine which of the records in the training dataset were the cause of the flawed training.

Various technologies described herein can be used to address these problems by providing iterative machine learning and relearning. A training dataset can be divided into a plurality of training data blocks. The training data blocks can be used to generate separate machine learning models. Accuracies of the machine learning models can be assessed using one or more test datasets. Training data blocks which result in models with good accuracies can be combined into larger training data blocks. The combined training data blocks can be used to generate new machine learning models. The process of combining training data blocks to make successively larger training data blocks can be repeated as long as the resulting machine learning model has acceptable accuracy. However, if a machine learning model generated using a combined training data block has a poorer accuracy than the machine learning models for its component training data blocks, then the combined training data block and its machine learning model can be forgotten and its component training data blocks (and their associated machine learning models) can be relearned.

The process of forgetting the combined training data block, and relearning its component training data blocks, can comprise backtracking using a pair of blockchain data structures. A first blockchain can be used to track entries for the training data blocks and a second blockchain can be used to track entries for machine learning models generated using the training data blocks. When an entry for a combined training data block is added to the first blockchain, it is associated with entries in the blockchain for the component training data blocks that make up the combined training data block. The entries for the component training data blocks can then be deactivated. An entry for a machine learning model generated using the combined training data block can be added to the second blockchain and associated with entries for machine learning models generated using the component training data blocks. The entries for the machine learning models associated with the component training data blocks can be deactivated as well.

If it is determined that the model produced using the combined machine learning model has a poorer accuracy than the machine learning models for the component training data blocks, then the entry in the first blockchain for the combined training data block, and the entry in the second blockchain for its machine learning model, can be deactivated in order to unlearn the combined training data block and its associated machine learning model. Backtracking can then be used to identify entries in the first blockchain associated with the component training data blocks, and to identify entries in the second blockchain associated with their machine learning models. The identified entries in the blockchains can then be reactivated in order to relearn the component training datasets and their associated machine learning models.

By repeating this process, in at least some scenarios, the iterative machine learning and relearning can backtrack to avoid poor quality training records and converge on a training dataset that produces the most accurate machine learning model for a given training dataset.

Example 2—Example Systems and Methods for Iterative Machine Learning

In any of the examples described herein, systems and methods can be provided for iterative machine learning and relearning.

FIG. 1A is a system diagram depicting an example system 100 configured for iterative machine learning and relearning. The example system 100 comprises a computing device 110 connected to a computer-readable storage 120. The computing device 110 can be connected to the computer-readable storage 120 via one or more wired and/or wireless connections. The computer-readable storage 120 can comprise one or more computer-readable storage media capable of storing data.

In a particular embodiment, the computing device 110 and the computer-readable storage 120 are connected via one or more communication channels of a motherboard. However, other configurations are possible. For example, the computing device 110 can be connected to the computer-readable storage 120 via one or more computer network connections.

The computer-readable storage 120 comprises a training dataset 130 and a test dataset 140. The training dataset 130 comprises data records that can be used to train one or more machine learning models (e.g., 151-158). The test dataset 140 comprises data records that can be used to determine an accuracy of a machine learning model. In at least some embodiments, the training dataset 130 and the test dataset 140 are parts of a single dataset, from which a plurality of records have been selected to form the test dataset 140 and another plurality of records have been selected to form the training dataset 130. For example, records can be randomly selected to form the test dataset 140 and the remaining records of the dataset can be used to form the training dataset 130.

The computing device 110 is configured to partition at least part of the training dataset 130 into a plurality of training data blocks 161-167. Four training data blocks (161-167) are depicted in FIG. 1A. However, this is for illustration purposes. Other numbers of training data blocks are possible. A training data block can comprise a subset of records in the training dataset 130 that can be used to generate a machine learning model (e.g., 151-157). The number of records included in each training data block can be based on a variety of factors, such as the type of machine learning algorithms used to generate machine learning models from the data records, the type of training data contained in the training records of the training dataset 130, etc. In at least some embodiments, the training data blocks 161-167 contain the same number of data records. However, it is also possible for training data blocks to contain different numbers of records.

The computing device 110 can be configured to generate machine learning models 151-157 based on the training data blocks 161-167. For each of the training data blocks 161-167, the computing device 110 can generate a machine learning model using the training data block. For example, the computing device 110 can use the training data block 161 to generate the machine learning model 151. Likewise, the computing device 110 can use the training data block 163 to generate the machine learning model 153, the training data block 165 to generate the machine learning model 155, the training data block 167 to generate the machine learning model 157, etc.

In at least some embodiments, the computing device 110 can generate accuracy scores 113 for each of the generated machine learning models 151-157. The accuracy scores 113 can be stored in the computing device 110, the computer-readable storage 120, and/or another computer-readable storage (not shown) connected to the computing device 110. An accuracy score for a machine learning model can be determined using the test dataset 140. For example, the test dataset 140 can comprise records which can be provided as input to a machine learning model (e.g., 151-157), along with expected outputs associated with the records. When a record in the test dataset 140 is provided as input to a machine learning model, the actual output from the machine learning model for the record can be compared to the expected output associated with the record in the test dataset 140. If the actual output is sufficiently similar to the expected output, then the record can be marked as a success. However if the actual output is not sufficiently similar to the expected output, then the record can be marked as a failure. An accuracy score for the machine learning model can then be generated based on the successes and failures. In a particular embodiment, an accuracy score for a machine learning model comprises a delta set, which refers to a sum of the differences between the expected outputs associated with the records of the test dataset 140 and the actual outputs of the machine learning model. In a different or further embodiment, the accuracy scores for machine learning models can be stored in association with the machine learning models (e.g., 151-157) and/or the training data blocks (e.g., 161-167) used to generate the machine learning model. The process of generating an accuracy score can be repeated for each of the machine learning models 151-157 generated using the training data blocks 161-167, respectively.

The computing device 110 can be configured to select two of the training data blocks 161-167 based on the accuracy scores 113 for the plurality of training blocks 161-167. For example, two of the plurality of training data blocks 161-167 which have the two best accuracy scores can be selected. In the example depicted in FIG. 1A, the training data block 161 and the training data block 163 have been selected.

The computing device 110 can deactivate the two selected training data blocks 161 and 163, and the two machine learning models 151 and 153 that were generated using the two training data blocks 161 and 163. In FIG. 1A, the training data blocks 161 and 163, and the machine learning models 151 and 153 are depicted as being deactivated. Deactivating a training data block can comprise making the training data block unavailable for future use. Likewise, deactivating a machine learning model can comprise making the machine learning model unavailable for future use. For example, a deactivated training data block may be unavailable for subsequent iterations of the iterative machine learning process. For example, a deactivated machine learning model may be unavailable for subsequent iterations of the iterative machine learning process. Additionally or alternatively, a deactivated machine learning model may be unavailable for use in prediction operations.

The computing device 110 can be configured to generate a new training data block 168 based on the two deactivated training data blocks 161 and 163. The new training data block 168 can represent a combination of records contained in the training data block 161 and the training data block 163. In a particular embodiment, the new training data block 168 represents all of the records contained in the training data block 161 and all of the records contained in the training data block 163. The computing device 110 can generate a new machine learning model 158 based on the new training data block 168. The computing device 110 can then activate the new training data block 168 and the new machine learning model 158. Activating a training data block can comprise making the training data block available for future use. Likewise, activating the machine learning model can comprise making the machine learning model available for future use. For example, by activating the new data training block 168, the computing device 110 can make the new training data block 168 available for subsequent iterations of the iterative machine learning process. For example, by activating the new machine learning model 158, the computing device 110 can make the new machine learning model 158 available for subsequent iterations of the iterative machine learning process. Additionally or alternatively, by activating the new machine learning model 158, the computing device 110 can make the new machine learning model 158 available for prediction operations. Such prediction operations can comprise receiving input data and providing the input data to the new machine learning model 158, generating one or more predictions and/or classifications using the new machine learning model 158 based on the input data, and providing the one or more predictions and/or classifications in one or more responses. Although the new training data block 168 is depicted in computing device 110, in at least some embodiments, the computing device 110 can be configured to store the new training data block in the computer-readable storage 120, or another computer-readable storage connected to the computing device 110.

The process of combining training data blocks, generating new machine learning models based on the combined training data blocks, and deactivating the component training data blocks and their associated machine learning models, as described above, can be repeated iteratively. For example, another training data block (e.g., 165) of the plurality of training data blocks 161-167 can be selected and combined with the new training data block 168 to create another new training data block (not shown). In at least some embodiments, the training data block (e.g., 165) can be selected based on an accuracy score associated with the training data block (e.g., 165). The selection can be made from the training data blocks 161-167 that are currently active. For example, the training data blocks 161 and 163 can be excluded from the selection since they are currently deactivated. The another new training dataset can be used to generate another new machine learning model (not shown). The new training data block 168 and the new machine learning model 158 can be deactivated and the another new training data block and the another new machine learning model can be activated. Additionally or alternatively, two training data blocks in the training dataset (e.g., 165 and 167) can be combined and used to create a new machine learning model, instead of using the new training data block 168. In at least some such embodiments, the new training data block 168 can be treated like the active training data blocks in the training dataset 130 (e.g., 165 and 167), and two active training data blocks can be selected from the pool of all active training data blocks based on accuracy scores associated with the training data blocks. For example, an accuracy score can be generated for the new machine learning model 158 using the test dataset 140 and used as a selection criterion for the new training data block 168. The iterative process can then repeat again with the remaining active training data blocks, etc.

Optionally, the example system 100 can comprise one or more additional computing devices that are connected to the computer-readable storage 120, such as the computing device 170. The one or more additional computing devices can be configured to perform all or part of the iterative machine learning process as described above. For example, the computing device 170 can be configured to select another two training data blocks (e.g., 165 and 167), of the plurality of training data blocks 161-167, based on the accuracy scores of the plurality of training data blocks 161-167. In at least some embodiments, the selection can be limited to currently active training data blocks. The computing device 170 can deactivate the another two training data blocks and can deactivate machine learning models generated using the another two training data blocks. The computing device 170 can generate another new training data block 169 based on the another two training data blocks. For example, the another new training data block 169 can comprise training records contained in the training data blocks 165 and 167. The computing device 170 can generate another new machine learning model (not shown) using the another new training data block 169. The computing device 170 can activate the another new training data block 169 and the another new machine learning model. In at least some embodiments, the computing device 170 can be configured to generate accuracy scores 173 for machine learning models using the test dataset 140. In such an embodiment, the computing device 170 can associate accuracy scores with training data blocks used to generate the machine learning models. For example, the computing device 170 can generate an accuracy score for the another new machine learning model using the test dataset 140 and can associate the accuracy score with the another new training data block 169.

Additionally or alternatively, the computing device 110 and the computing device 170 (and possibly additional computing devices) can be configured to perform the iterative machine learning process in a distributed manner. For example, both computing devices 110 and 170 can be configured to select training data blocks to combine, generate new machine learning models, and activate/deactivate training data blocks and machine learning models concurrently. In at least some such embodiments, data can be shared among the computing devices. For example, the computing device 170 can consider the new training data block 168 (and associated accuracy score) when selecting active training data blocks for combination. Similarly, the computing device 110 can consider the another new training data block 169 (and associated accuracy score) when considering active training data blocks for combination.

Although the training dataset 130 is depicted as a single set of data records in FIG. 1A, the training dataset 130 can comprise multiple sets of data. For example, different training records may be provided at different times. An initial set of training records may be provided and processed using the iterative machine learning process. Then additional training records may be provided. The additional records can be partitioned into additional training data blocks and processed along with any currently active training data blocks remaining from previous iterations.

Figure 2:
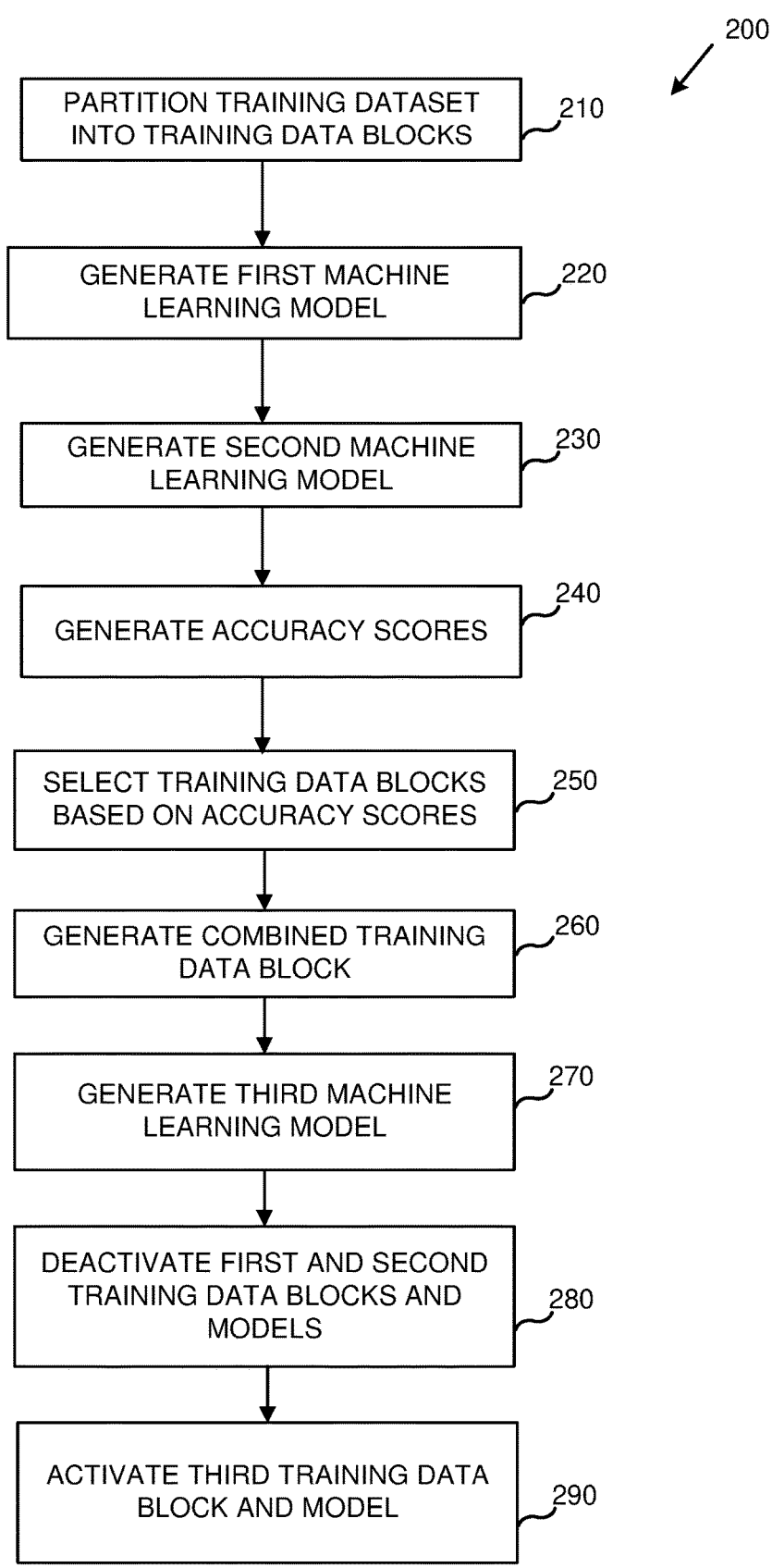
FIG. 2 is a flowchart of an example method for iterative machine learning.

FIG. 2 is a flowchart of an example method 200 for iterative machine learning. Any of the example systems described herein can be used to perform the example method 200. For example, the example system 100 can be used to perform all or part of the example method 200.

At 210, a machine learning model training dataset this partitioned into a plurality of training data blocks. For example, the computing device 110 can partition the training dataset 130 into a plurality of training data blocks 161-167.

At 220, a first machine learning model is generated using a first training data block, of the plurality of training data blocks. For example, the computing device 110 can generate a machine learning model 151 using the training data block 161.

At 230, a second machine learning model is generated using a second training block, of the plurality of training blocks. For example, the computing device 110 can generate a machine learning model 153 using the training data block 163.

At 240, accuracy scores are generated for the first machine learning model and the second machine learning model. For example, the computing device 110 can generate accuracy scores 113 for the machine learning model 151 and the machine learning model 153. The accuracy scores can be generated using a test dataset. For example, the computing device 110 can generate the accuracy scores 113 using the test dataset 140. A test dataset can comprise a plurality of test records associated with the expected outputs. An expected output is an output that is expected to be received when the associated test record is processed using a machine learning algorithms and a machine learning model. An accuracy score can be generated by processing test records in a test dataset using a machine learning model, and comparing the actual outputs received with the expected outputs associated with the test records. In a particular embodiment, an accuracy score can comprise a delta set which refers to a sum of the differences between the expected outputs for a test dataset and the actual outputs received when the test records were processed using a machine learning model. Once an accuracy score is generated, it can be associated with the training data block that was used to generate the machine learning model.

At 250, the first training data block and the second training data block are selected for combination. For example, the first training data block and the second training data block can be selected based, at least in part, on the accuracy scores for the first machine learning model and the second machine learning model. For example, the training data block 161 and the training data block 163 can be selected based on accuracy scores 113 that were generated by the computing device 110 for the machine learning model 151 and the machine learning model 153. The selection can comprise comparing the accuracy scores associated with the generated machine learning models and selecting two of the training data blocks with the best accuracy scores. In at least some embodiments, the selection can be limited to training data blocks and machine learning models that are currently active.

At 260, a third training data block is generated that comprises a combination of the first training data block and the second training data block. For example, the third training data block can comprise all of the training records contained in the first training data block and all of the records contained in the second training data block. For example, the computing device 110 can generate the new training data block 168 using a combination of training records contained in the training data block 161 and the training data block 163.

At 270, a third machine learning model is generated using the third training data block. For example, the computing device 110 can generate a new machine learning model 158 using the new training data block 168.

At 280, the first training data block, the second training data block, the first machine learning model, and the second machine learning model are deactivated. For example, the computing device 110 can deactivate the training data block 161, the training data block 163, the machine learning model 151, and the machine learning model 153. Deactivating a training data block can comprise making the training data block unavailable for future use. Deactivating a machine learning model can comprise making the machine learning model unavailable for future use. For example, deactivating a training data block and/or a machine learning model may make the training data block and/or the machine learning model unavailable for subsequent iterations of the example method 200. Additionally or alternatively, deactivating a machine learning model can comprise making the machine learning model unavailable for performing machine learning predictions and/or classifications.

At 290, the third training data block and the third machine learning model are activated. For example, the computing device 110 can activate the new training data block 168 and the new machine learning model 158. Activating a training data block can comprise making the training data block available for future use. Activating a machine learning model can comprise making the machine learning model available for future use. For example, activating a training data block and/or a machine learning model can make the training data block and/or machine learning model available for subsequent iterations of the example method 200. Additionally or alternatively, activating a machine learning model can comprise making the machine learning model available for performing machine learning predictions and/or classifications. For example, when performing machine learning predictions and/or classifications, the computing device 110 can be configured to select one or more active machine learning models and to not select any inactive machine learning models.

In at least some embodiments, the example method 200 can be repeated iteratively. For example, a fourth machine learning model can be generated using a fourth training data block, of the plurality of training data blocks. A fifth training data block can be generated that comprises a combination of the third training data block and the fourth training data block. A fifth machine learning model can be generated using the fifth training data block. The third training data block, the fourth training data block, the third machine learning model, and the fourth machine learning model can be deactivated; and the fifth training data block and the fifth machine learning model can be activated. The iterative process can be repeated until all available data blocks have been processed and/or a combined training data block has been generated which results in a machine learning model that produces a best accuracy score. In scenarios where a combined training data block results in a machine learning model with a worse accuracy score than accuracy scores for its component training data blocks, the combined training data block can be unlearned and the component training data blocks can be relearned as described herein.

Example 3—Example Systems and Methods for Machine Relearning

In any of the examples described herein, systems and methods can be provided for machine relearning. In at least some scenarios, a model generated using a combined training data block may prove to be less accurate than the machine learning models of the component training data blocks. In such a scenario, the combined training data block and its associated machine learning model can be unlearned, and the component training data blocks and their associated machine learning models can be relearned.

Figure 3:
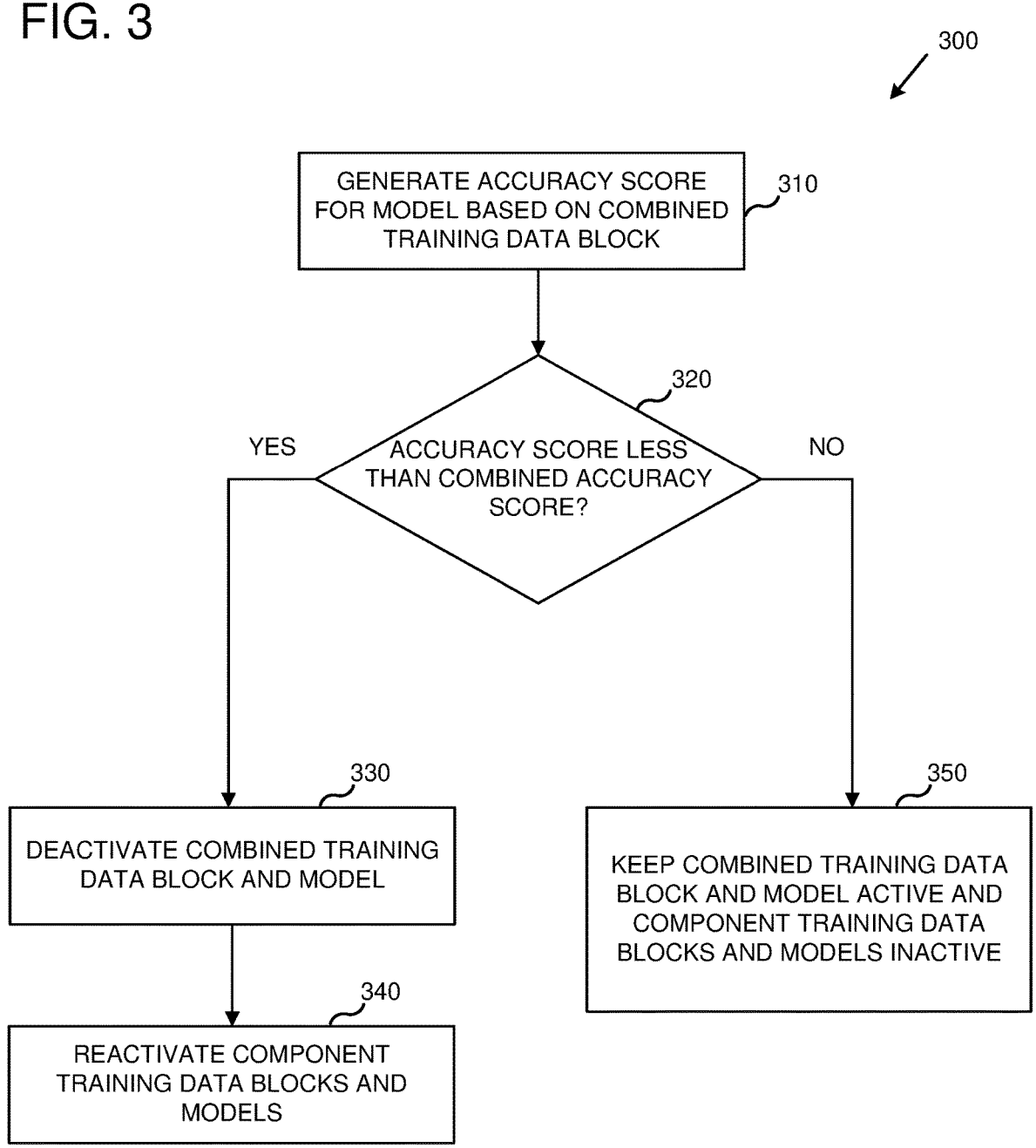
FIG. 3 is flowchart of an example method for iterative machine relearning.

FIG. 3 is a flowchart of an example method 300 for machine relearning. Any of the example systems described herein can be used to perform the example method 300. For example, the example system 100 can be used to perform all or part of the example method 300.

Figure 1B:
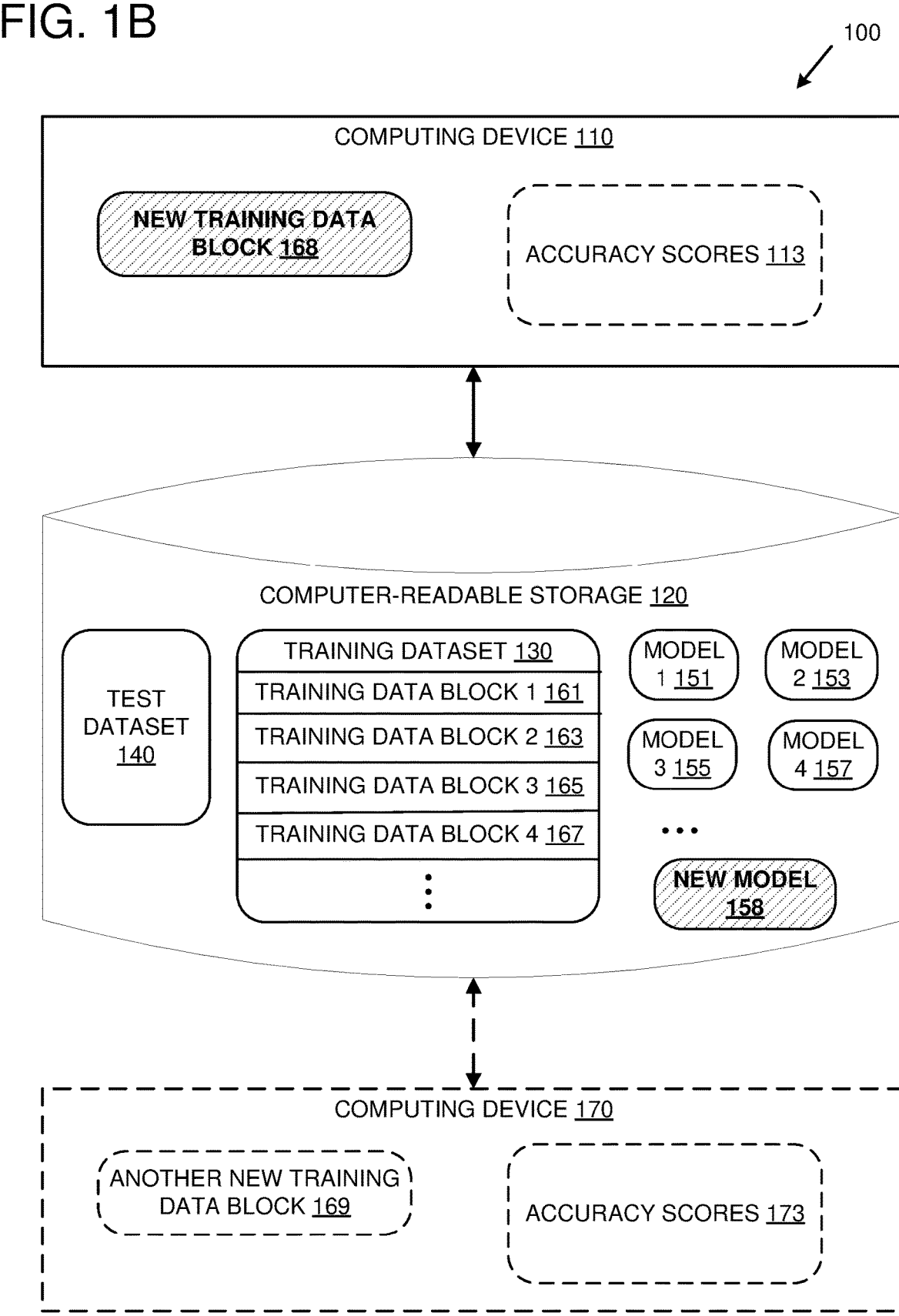

FIG. 1B is a system diagram depicts an example machine relearning scenario using the example system 100. In the scenario depicted in FIG. 1B, previously inactive training data blocks 161 and 163, and previously inactive machine learning models 151 and 153 have been re-learned by activating them and deactivating the subsequent new training data block 168 and subsequent machine learning model 158.

Referring to FIG. 3, at 310, an accuracy score for a machine learning model based on a combined training data block is generated. For example, an accuracy score can be generated by the computing device 110 for the machine learning model 158. The accuracy score can be generated by applying records in the test dataset 140 to the machine learning model 158 and comparing the results to expected results associated with records and the test dataset 140.

At 320, it is determined whether the accuracy score for the machine learning model based on the combined training data block is less than a combined accuracy score that is based on accuracy scores for machine learning models associated with the component training data blocks of the combined training data block. The combined accuracy score for the component training data blocks can be generated, at least in part, by combining accuracy scores for machine learning models generated using the component training data blocks. In a particular embodiment, the combined accuracy score is generated by dividing a sum of the accuracy scores associated with the component data blocks by the number of the component data blocks.

For example, the computing device 110 can generate a combined accuracy score for the training data block 161 and the training data block 163, which are the component training data blocks of the training data block 168. The combined accuracy score can be generated by adding an accuracy score associated with the machine learning model 151 and an accuracy score associated with the machine learning model 153, and then dividing the sum by two. An accuracy score for the machine learning model 158 can then be compared to the combined accuracy score for the machine learning models 151 and 153.

If the accuracy score for machine learning model generated using the combined data block is less than the combined accuracy score for the machine learning models generated using the component training data blocks then, at 330, the combined training data block and the machine learning model generated using the combined training data block are deactivated. For example, if the accuracy score for the machine learning model 158 is less than the combined accuracy score for the training data blocks 161 and 163, then the training data block 168 and the machine learning model 158 can be deactivated by the computing device 110 (as is depicted in FIG. 1B). Deactivating the training data block 168 and the machine learning model 158 can comprise making the training data block 168 and the machine learning model 158 unavailable for subsequent iterations of an iterative machine learning process.

At 340, the component training data blocks, and the machine learning models generated using the component training data blocks, are reactivated. For example, the training data blocks 161 and 163, and the machine learning models 151 and 153 can be reactivated by the computing device 110 (as is depicted in FIG. 1B). Reactivating the training data blocks 161 and 163, and the machine learning models 151 and 153, can comprise making the training data blocks 161 and 163, and the machine learning models 151 and 153, available for subsequent iterations of an iterative machine learning process.

However, if the accuracy score for the combined training data block is greater than or equal to the combined accuracy score for the component training data blocks, then, at 350, the combined training data block and the machine learning model generated using the combined training data block are kept active. The component training data blocks, and the machine learning models generated using the component training data blocks, are kept inactive. For example, the computing device 110 can keep the training data blocks 161 and 163, and the machine learning models 151 and 153, inactive (as is depicted in FIG. 1A). The computing device 110 can keep the training data block 168 and the machine learning model 158 active (as is depicted in FIG. 1A).

Thus, in at least some scenarios, machine learning models based on combined training data blocks can be unlearned when they are less accurate than the machine learning models based on the component training data blocks of the combined training data block. The component training data blocks, and their associated machine learning models, can be relearned and re-used for subsequent iterations of an iterative machine learning process. However, if the machine learning model generated using the combined training data block is more accurate than, or as accurate as, the machine learning models generated using the component training data blocks, then the combined training data block, and the machine learning model generated using the combined training data block, can be retained and the component training data blocks, and their associated machine learning models, can be forgotten.

Example 4—Example Blockchains

In any of the examples described herein, systems and methods can be provided for using blockchains for iterative machine learning and relearning.

Figure 4A:
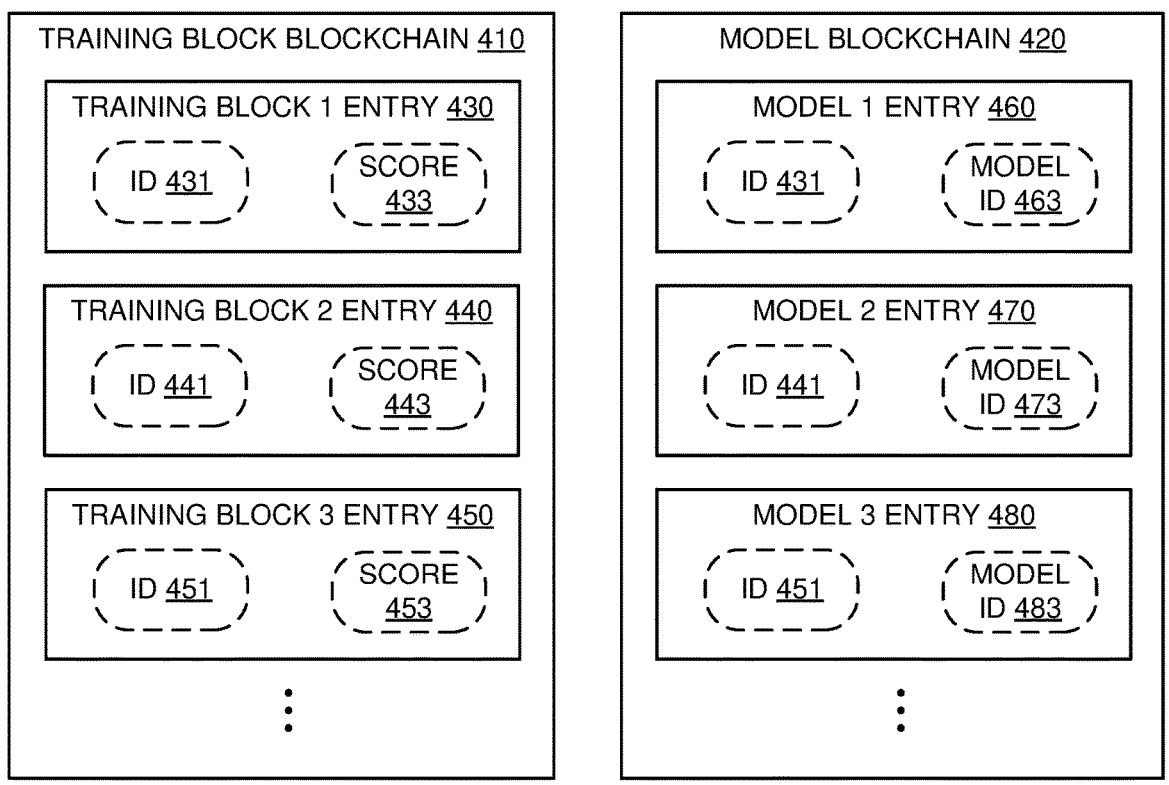
FIGS. 4A-B are block diagrams depicting example blockchains for use in iterative machine learning and relearning.

FIG. 4A is a block diagram depicting an example pair of blockchains 410 and 420 that can be used in iterative machine learning and relearning. The training data block blockchain 410 comprises entries 430-450 associated with training data blocks that are generated as part of an iterative machine learning process as described herein. For example, the entries 430-450 can be created for a plurality of training data blocks in a training dataset. Although three entries 430-450 are depicted in FIG. 4A, other numbers of entries are possible.

The model blockchain 420 comprises entries 460-480 associated with machine learning models that are generated using training data blocks as part of an iterative machine learning process as described herein. For example, the entries 460-480 can be created for machine learning models generated using the training data blocks associated with entries 430-450 in the blockchain 410. Although three entries 460-480 are depicted in FIG. 4A, other numbers of entries are possible.

A blockchain (e.g., 410, 420) can comprise a data structure in which subsequent entries are linked to one or more previous entries. For example, entries can be linked by creating a hash of an entry to be added to the blockchain and one or more entries already in the blockchain. In at least some embodiments, one or more of the blockchain 410 and the blockchain 420 can comprise distributed ledgers. In such embodiments, multiple computing devices storing copies of the distributed ledger(s) may need to arrive at a consensus before a new entry in the blockchain containing the distributed ledger can be finalized. The blockchains 410 and 420 can be stored in one or more computer-readable storages as described herein.

In at least some embodiments, entries 430-450 in the blockchain 410 can comprise training data block identifiers and/or accuracy scores associated with training data blocks. An accuracy score associated with the training data block can comprise a sum of differences between outputs generated using a machine learning model associated with the training data block and expected outputs for a given test dataset. Such an accuracy score can be referred to as a delta set. In a different or further embodiment, creating an entry in the training data blockchain 410 for a given training data block (e.g., 430) comprises storing an identifier (e.g., 431) for the given training data block in the training data blockchain 410. For example, such an identifier can be stored as part of an entry (e.g., 430) for the training data block. Such an identifier for a training data block can comprise an identifier for an iteration of an iterative machine learning process in which the training data block was evaluated. For example, iterations of the iterative machine learning process can be associated with values of an incremented index. When an entry for a training data block is added to the blockchain 410, the index value for the current iteration of the iterative machine learning process can be used as an identifier for the training data block entry in the blockchain 410. Before the subsequent iteration of the iterative machine learning process, the index can be incremented to create a new index value for the subsequent iteration.

In at least some embodiments, entries in the blockchain 410 can be correlated with entries in the blockchain 420 using the training data block identifiers. For example, an identifier associated with a given training data block (such as an iteration index for an iteration of an iterative machine learning process in which the given training data block is evaluated) can be stored as part of an entry for the training data block in the blockchain 410 and also as part of an entry in the blockchain 420 for a machine learning model generated using the training data block.

For example, in a first iteration of an iterative machine learning process, the entry 430 can be added for a training data block that is evaluated during the first iteration. The entry 430 can comprise an identifier 431 associated with the training data block (such as an index value for the first iteration, a unique identifier for the training data block, etc.). The entry 460 can be added to the blockchain 420 for a machine learning model generated using the training data block associated with the entry 430. The entry 460 can comprise the identifier 431 associated with the training data block. Using the identifier 431, the entry 430 in the blockchain 410 and the entry 460 in the blockchain 420 can be correlated. Optionally, the entry 460 can comprise another identifier 463 associated with the machine learning model. Such an identifier can be used to locate the machine learning model in a computer-readable storage. Additionally or alternatively, the entry 430 can comprise an accuracy score 433 associated with the training data block. The accuracy score 433 can be generated using the machine learning model associated with the entry 460, which was generated using the training data block associated with the entry 430.

In a subsequent iteration of the iterative machine learning process, the entry 440 can be added to the blockchain 410. The entry 440 can comprise an identifier 441 associated with another training data block evaluated in the subsequent iteration. The entry 470 can be added to the blockchain 420 and associated with a machine learning model generated using the another training data block (for example, via a machine learning model identifier 473). The entry 440 and the entry 470 can comprise the identifier 441 associated with the another training data block. The entry 440 can comprise an accuracy score 443 that is generated using the machine learning model associated with the entry 470.

In another subsequent iteration of the iterative machine learning process, the entry 450 can be added to the blockchain 410. The entry 450 can comprise an identifier 451 associated with yet another training data block evaluated in the another subsequent iteration. The entry 480 can be added to the blockchain 420 and associated with a machine learning model generated using the yet another training data block (for example, via a machine learning model identifier 483). The entry 450 and the entry 480 can comprise the identifier 451 associated with the yet another training data block. The entry 450 can comprise an accuracy score 453 that is generated using the machine learning model associated with the entry 480.

After two or more entries for training data blocks in a training dataset have been added to the blockchain 410, subsequent iterations of the iterative machine learning process can comprise generating combined training data blocks based on two or more of the training data blocks in the training dataset, and generating machine learning models using the combined training data blocks. When an entry is added to the blockchain 410 for a combined training data block (e.g., training data block 168 depicted in FIG. 1A), the entry can be associated with entries for the component training data blocks on which the combined training data block is based.

Figure 4B:
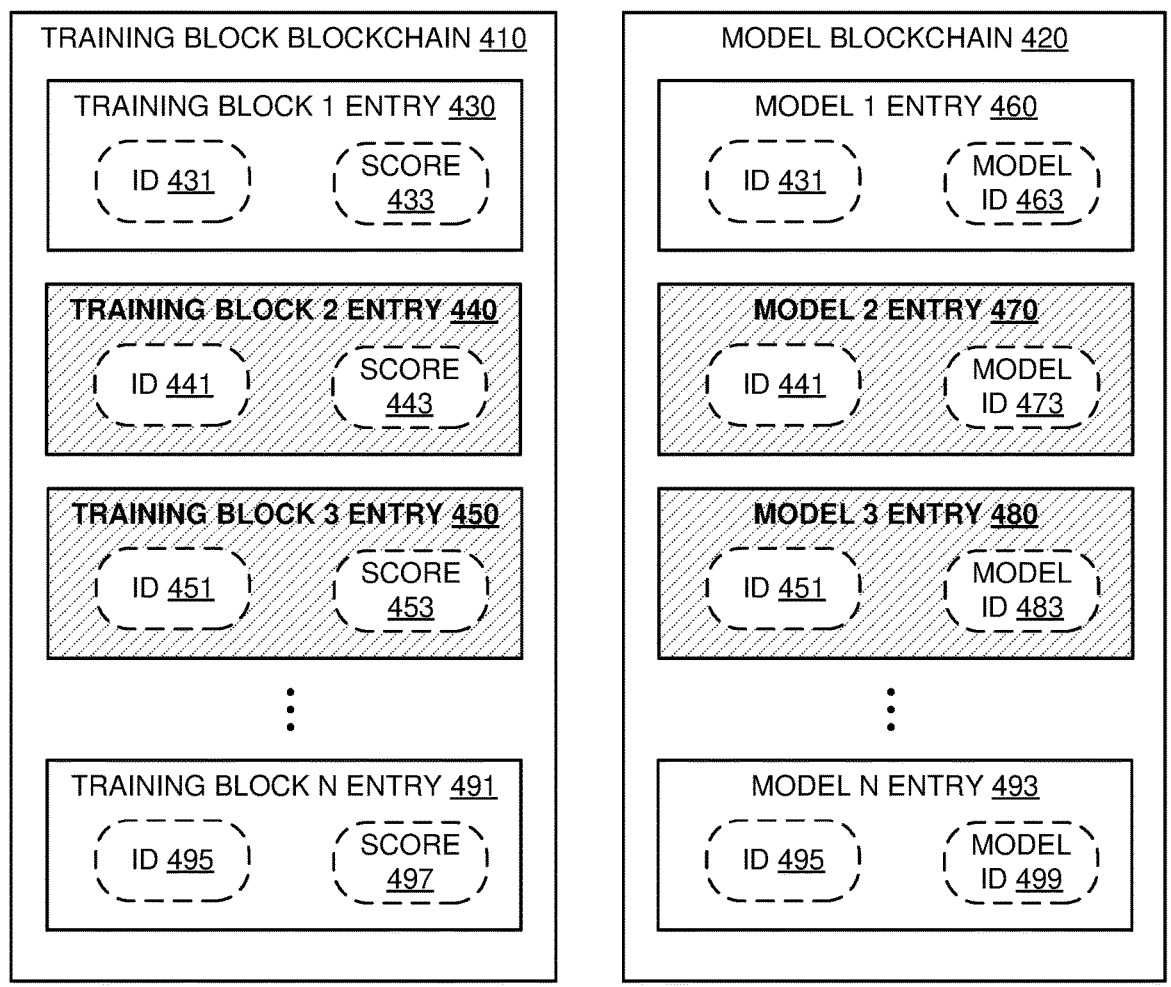

FIG. 4B is a block diagram depicting the example blockchains 410 and 420 after entries have been added for a combined training data block and a machine learning model generated using the combined training data block. In the scenario depicted in FIG. 4B, an entry 491 is added to the blockchain 410 for a training data block that is based on a combination of training data blocks associated with the entries 440 and 450. An identifier 495 for the entry for the combined training data block (such as an iteration of the iterative machine learning process in which the combined training data block is created) is included in the entry 491. An entry 493 for a machine learning model generated using the combined training data block is added to the blockchain 420. The entry 493 can be associated with the entries 470 and 480 which are associated with machine learning models generated using the training data blocks associated with the entries 440 and 450.

The entries 440 and 450 can be marked as inactive in the blockchain 410 (as is depicted in FIG. 1B). In at least some embodiments, the entries 440 and 450 can be marked as inactive in order to deactivate the component training data blocks associated with the entries 440 and 450. For example, when selecting training data blocks for evaluation in an iteration of an iterative machine learning process, training data blocks that are associated with the inactive entries in the blockchain 410 can be omitted from the selection. In at least some embodiments, the entries 470 and 480 that are associated with machine learning models generated using the training data blocks associated with the entries 440 and 450 can also be marked as inactive. The entries 470 and 480 can be marked as inactive in order to deactivate the machine learning models associated with the entries 470 and 480.

Determining whether or not to relearn training data blocks and associated machine learning models can comprise evaluating the accuracy scores stored in the entries in the blockchain 410. For example, the accuracy score 497 can be compared to a combined accuracy score based on the scores 443 and 453. If the accuracy score 497 is not greater than the combined accuracy score based on the scores 443 and 453, then the combined training data block associated with the entry 491 can be deactivated and the component training data blocks associated with the entries 440 and 450 can be reactivated. Deactivating the combined training data block can comprise marking the entry 491 as inactive. Reactivating the component training data blocks can comprise marking the entries 440 and 450 as active. The machine learning model generated using the combined training data block can also be deactivated, and the machine learning models generated using the component training data blocks can be reactivated. Deactivating the machine learning model generated using the combined training data block can comprise marking the entry 493 and the blockchain 420 as inactive. Reactivating the machine learning models generated using the component training data blocks can comprise marking the entries 470 and 480 in the blockchain 420 as active.

Thus, in at least some embodiments, as training data blocks are used to generate machine learning models and those machine learning models are evaluated to produce accuracy scores, entries for the training data blocks and the associated machine learning models can be added to the blockchain's 410 and 420, respectively. As training data blocks are supplanted by successive combinations of training data blocks, the previous component training data blocks can be deactivated, along with their associated machine learning models, by marking the blockchain entries associated with the training data blocks and the machine learning models as inactive. If a combined training data block does not produce a more accurate machine learning model, it can be unlearned by marking the entry for the combined training data block in the blockchain 410, and the entry in the blockchain 420 for the associated machine learning model, as inactive. The component training data blocks and associated machine learning models can be relearned by marking the associated entries in the blockchain 410 and the blockchain 420 as active.

Example 5—Example Machine Learning Models

In any of the examples described herein, a machine learning model can comprise one or more data structures generated by a machine learning process. Machine learning processes can comprise supervised learning processes, unsupervised learning processes, semi-supervised learning processes, or some combination thereof. Example machine learning models include artificial neural networks, decision trees, support vector machines, hidden Markov models, etc. A machine learning model can be generated by processing training records using a machine learning process. Training records can comprise one or more input fields (sometimes referred to as independent variables) and one or more output fields (sometimes referred to as dependent variables). A machine learning model can comprise a representation of one or more relationships generalized by a machine learning process based on the training records.

Example 6—Example Computing Systems

Figure 5:
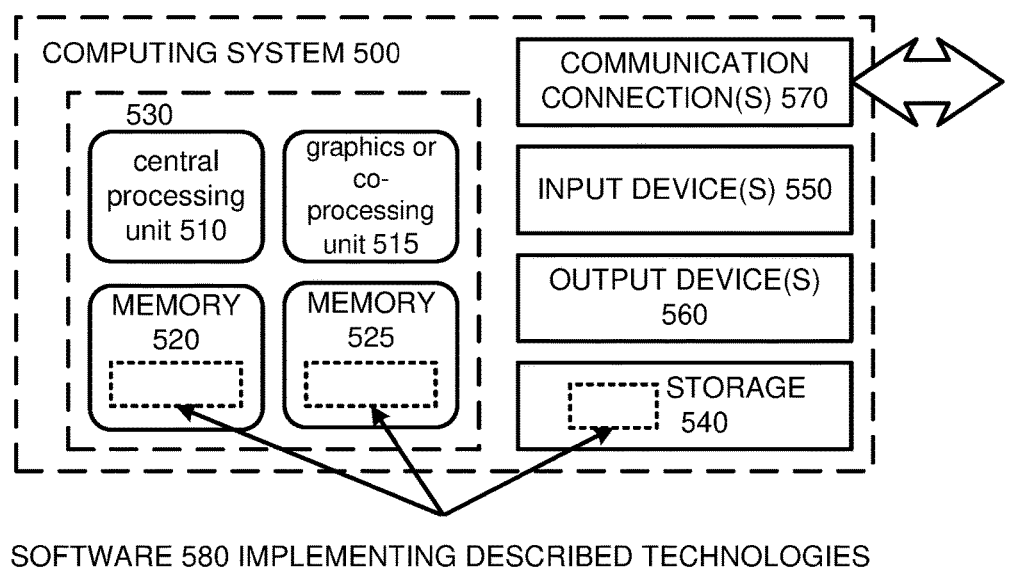
FIG. 5 is a block diagram of an example computing system in which some described embodiments can be implemented.

FIG. 5 depicts a generalized example of a suitable computing system 500 in which the described innovations may be implemented. For example, the computing system 500 can be used as a development computing device, client computing device, and/or server computer as described herein. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, solid state drives, etc.), or some combination of the two, accessible by the processing unit(s). The memory 520, 525 can store software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, solid state drives, CD-ROMs, DVDs, or any other medium which can be used to store information in a non-transitory way and which can be accessed within the computing system 500. The storage 540 can store instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 7—Example Cloud Computing Environment

Figure 6:
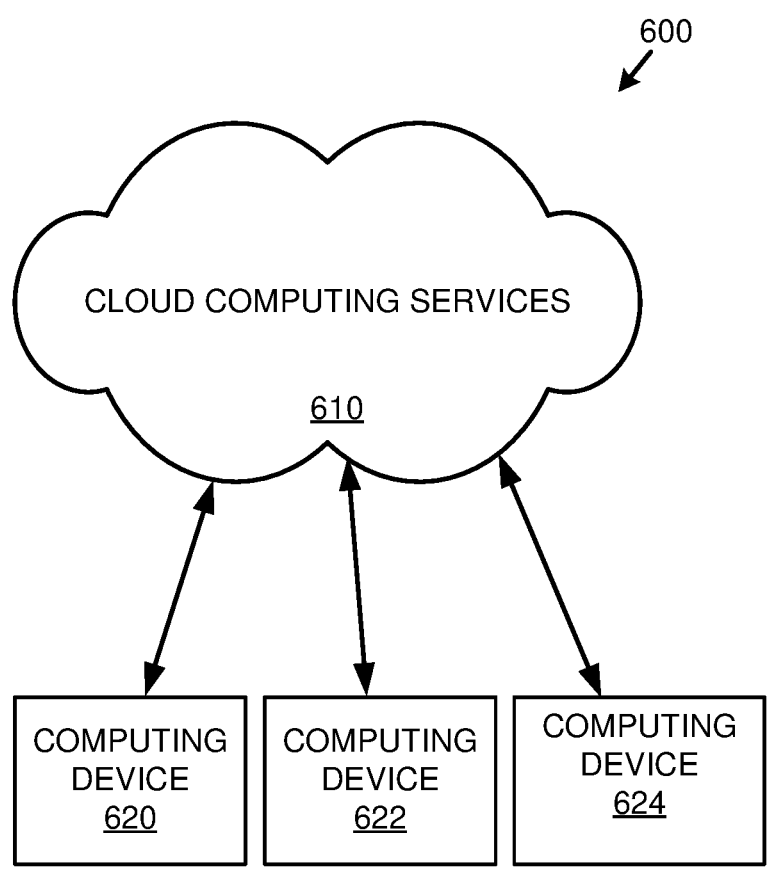
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, networking resources, etc. For example, one or more computer servers of the cloud computing services 610 can be used as a server as described herein. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operators (e.g., data processing, data storage, and the like). One or more of the computing devices can be embedded devices that comprise integrated circuits (such as Internet of Things (IoT) devices, etc.).

Example 8—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 5, computer-readable storage media include memory 520 and 525, and storage 540. The term computer-readable storage media does not include signals and carrier waves. In addition, the term computer-readable storage media does not include communication connections (e.g., 570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A method, comprising:
partitioning a machine learning model training dataset into a plurality of training data blocks;
generating a first machine learning model exclusively using a first training data block, of the plurality of training data blocks;
generating a second machine learning model exclusively using a second training data block, of the plurality of training data blocks;
generating an accuracy score for the first machine learning model and an accuracy score for the second machine learning model;
selecting the first training data block and the second training data block for combination with each other based, at least in part, on the accuracy score for the first machine learning model and the accuracy score for the second machine learning model;
generating a third training data block that comprises a combination of the first training data block and the second training data block;
generating a third machine learning model exclusively using the third training data block;
deactivating the first training data block, the second training data block, the first machine learning model, and the second machine learning model; and
activating the third training data block and the third machine learning model
wherein deactivating a training data block makes the training data block unavailable for being selected for generating a combined training data block in an iterative training process until the training data block is reactivated,
wherein deactivating a machine learning model makes the machine learning model unavailable for being selected for performing machine learning predictions or classifications until the machine learning model is reactivated.

2. The method of claim 1, further comprising:
generating an accuracy score for the third machine learning model;
determining that the accuracy score for the third machine learning model is less than a combined accuracy score based on the accuracy scores for the first machine learning model and the second machine learning model;
deactivating the third training data block and the third machine learning model; and
reactivating the first training data block, the second training data block, the first machine learning model, and the second machine learning model.

3. The method of claim 2, wherein:
the determining an accuracy score for a machine learning model comprises determining a difference between an expected output for the machine learning model and an actual output for the machine learning model; and
the determining that the accuracy score for the third machine learning model is less than the combined accuracy score based on the accuracy scores for the first training data block and the second training data block comprises:
determining that a number of differences between an expected output for the third machine learning model and an actual output for the third machine learning model is greater than a combined accuracy score for the first training data block and the second training data block.

4. The method of claim 1, further comprising:
creating entries in a first blockchain for the first training data block and the second training data block;

creating an entry in the first blockchain for the third training data block, wherein the entry is associated with the entries in the first blockchain for the first training data block and the second training data block; and creating entries in a second blockchain for the first machine learning model, the second machine learning model, and the third machine learning model.

5. The method of claim 4, wherein:

creating an entry in the first blockchain for a given training data block comprises storing an identifier for the given training data block in the first blockchain; and creating an entry in the second blockchain for a given machine learning model generated using the given training data block comprises storing the identifier for the given training data block in the second blockchain in association with an identifier for the given machine learning model.

6. The method of claim 5, wherein:

creating an entry in the first blockchain for the given training data block further comprises storing an accuracy score for the given machine learning model in the first blockchain in association with the identifier for the given training data block.

7. The method of claim 1, further comprising:

generating a fourth machine learning model exclusively using a fourth training data block, of the plurality of training data blocks;

generating a fifth training data block that comprises a combination of the third training data block and the fourth training data block;

generating a fifth machine learning model exclusively using the fifth training data block;

deactivating the third training data block, the fourth training data block, the third machine learning model, and the fourth machine learning model; and activating the fifth training data block and the fifth machine learning model.

8. A system, comprising:

a computer-readable storage storing a training dataset and a test dataset; and a computing device connected to the computer-readable storage, wherein the computing device is configured to:

partition at least part of the training dataset into a plurality of training data blocks;

for each of the plurality of training data blocks:
  generate a separate machine learning model exclusively using the training data block, and
  determine an accuracy score for the machine learning model using the test dataset;

select two training data blocks, of the plurality of training data blocks, for combination with each other based on the accuracy scores of the plurality of training data blocks;

deactivate the two training data blocks and the machine learning models for the two training data blocks;

generate a new training data block based on the two training data blocks;

generate a new machine learning model exclusively using the new training data block; and activate the new training data block and the new machine learning model, wherein deactivating a training data block makes the training data block unavailable for being selected for generating a combined training data block in an iterative training process until the training data block is reactivated, wherein deactivating a machine learning model makes the machine learning model unavailable for being selected for performing machine learning predictions or classifications until the machine learning model is reactivated.

9. The system of claim 8, wherein the computing device is further configured to:

determine that an accuracy score for the new machine learning model is less than a combined accuracy score based on accuracy scores for the two training data blocks;

deactivate the new training data block and the new machine learning model; and reactivate the two training data blocks and the machine learning models for the two training data blocks.

10. The system of claim 8, wherein:

the computer-readable storage comprises a training data block blockchain and a model blockchain; and the computing device is further configured to:
  create entries in the training data block blockchain for the plurality of training data blocks;
  create entries in the model blockchain for the machine learning models generated using the training data blocks and the new machine learning model; and
  create an entry in the training data block blockchain for the new training data block that is associated with the entries in the training data block blockchain for the two training data blocks.

11. The system of claim 10, wherein:

an entry in the training data block blockchain for a given training data block comprises an identifier for the given training data block; and an entry in the model blockchain for a machine learning model generated using the given training data block comprises the identifier for the given training data block.

12. The system of claim 8, wherein the computing device is further configured to:

select a third training data block, of the plurality of training data blocks;

generate another new training data block based on the new training data block and the third training data block;

generate another new machine learning model exclusively using the another new training data block;

deactivate the new training data block and the new machine learning model; and activate the another new training data block and the another new machine learning model.

13. The system of claim 8, further comprising:

another computing device connected to the computer-readable storage, wherein the another computing device is configured to:

select another two training data blocks, of the plurality of training data blocks, based on the accuracy scores for the plurality of training data blocks;

deactivate the another two training data blocks and machine learning models generated using the another two training data blocks;

generate another new training data block based on the another two training data blocks;

generate another new machine learning model exclusively using the new another training data block; and activate the another new training data block and the another new machine learning model.

14. One or more computer-readable storage media storing instructions that, when executed by one or more processors, cause the one or more processors to perform operations, the operations comprising:
- partitioning a machine learning model training dataset into a plurality of training data blocks;
- generating a first machine learning model exclusively using a first training data block, of the plurality of training data blocks;
- generating a second machine learning model exclusively using a second training data block, of the plurality of training data blocks;
- generating an accuracy score for the first machine learning model and an accuracy score for the second machine learning model;
- based, at least in part, on the accuracy score for the first machine learning model and the accuracy score for the second machine learning model, generating a third training data block that comprises a combination of the first training data block and the second training data block;
- generating a third machine learning model exclusively using the third training data block;
- deactivating the first training data block, the second training data block, the first machine learning model, and the second machine learning model;
- activating the third training data block and the third machine learning model;
- generating an accuracy score for the third machine learning model;
- determining that the accuracy score for the third machine learning model is less than a combined accuracy score based on the accuracy scores for the first machine learning model and the second machine learning model;
- responsive to determining that the accuracy score is less than the combined accuracy score, deactivating the third training data block and the third machine learning model; and
- reactivating the first training data block, the second training data block, the first machine learning model, and the second machine learning model,
- wherein deactivating a training data block makes the training data block unavailable for being selected for generating a combined training data block in an iterative training process until the training data block is reactivated,
- wherein deactivating a machine learning model makes the machine learning model unavailable for being selected for performing machine learning predictions or classifications until the machine learning model is reactivated.

15. The one or more computer-readable storage media of claim 14, wherein:
- determining an accuracy score for a machine learning model comprises determining a difference between an expected output for the machine learning model and an actual output for the machine learning model; and
- the determining that the accuracy score for the third machine learning model is less than the combined accuracy score based on the accuracy scores for the first training data block and the second training data block comprises:
  - determining that a number of differences between an expected output for the third machine learning model and an actual output for the third machine learning model is greater than a combined accuracy score for the first training data block and the second training data block.

16. The one or more computer-readable storage media of claim 14, wherein the operations further comprise:
- creating entries in a first blockchain for the first training data block and the second training data block;
- creating an entry in first blockchain for the third training data block that is associated with the entries in the first blockchain for the first training data block and the second training data block; and
- creating entries in a second blockchain for the first machine learning model, the second machine learning model, and the third machine learning model.

17. The one or more computer-readable storage media of claim 16, wherein:
- creating an entry in the first blockchain for a given training data block comprises storing an identifier for the given training data block in the first blockchain; and
- creating an entry in the second blockchain for a given machine learning model generated using the given training data block comprises storing the identifier for the given training data block in the second blockchain in association with an identifier for the given machine learning model.

18. The one or more computer-readable storage media of claim 17, wherein:
- creating an entry in the first blockchain for the given training data block further comprises storing an accuracy score for the given machine learning model in the first blockchain in association with the identifier for the given training data block.

19. The one or more computer-readable storage media of claim 14, wherein the operations further comprise:
- generating a fourth machine learning model exclusively using a fourth training data block, of the plurality of training data blocks;
- generating a fifth training data block that comprises a combination of the third training data block and the fourth training data block;
- generating a fifth machine learning model exclusively using the fifth training data block;
- deactivating the third training data block, the fourth training data block, the third machine learning model, and the fourth machine learning model; and
- activating the fifth training data block and the fifth machine learning model.

* * * * *